United States Patent
Schneider et al.

(10) Patent No.: US 8,346,407 B2
(45) Date of Patent: Jan. 1, 2013

(54) METHOD AND DEVICE FOR ASSIGNING A FIRST AUTOMOBILE TO A SECOND AUTOMOBILE

(75) Inventors: Herbert Schneider, Zellerndorf (AT); Robert Tschofen, Vienna (AT); Robert Vretska, Vienna (AT)

(73) Assignee: Continental Automotive GmbH, Hannover (DE)

( * ) Notice: Subject to any disclaimer, the term of this patent is extended or adjusted under 35 U.S.C. 154(b) by 862 days.

(21) Appl. No.: 12/233,196

(22) Filed: Sep. 18, 2008

(65) Prior Publication Data
US 2009/0076666 A1    Mar. 19, 2009

(30) Foreign Application Priority Data
Sep. 18, 2007   (DE) .................. 10 2007 044 395

(51) Int. Cl.
G06F 7/00     (2006.01)
G06F 17/00    (2006.01)

(52) U.S. Cl. ......... 701/2; 701/31.5; 701/33.7; 701/33.8; 701/34.1; 701/34.2; 701/430; 701/540

(58) Field of Classification Search ............ 701/2, 31.5, 701/33.7, 33.8, 34.1, 34.2, 430, 540; 340/5.8, 340/853.2; 455/196.1, 313
See application file for complete search history.

(56) References Cited

U.S. PATENT DOCUMENTS

| | | | | |
|---|---|---|---|---|
| 5,204,819 A * | 4/1993 | Ryan | .............................. | 705/413 |
| 5,365,516 A * | 11/1994 | Jandrell | ........................ | 370/335 |
| 5,815,071 A * | 9/1998 | Doyle | ............................ | 340/439 |
| 6,362,749 B1 * | 3/2002 | Brill | .............................. | 340/902 |
| 6,501,376 B2 * | 12/2002 | Dieckmann et al. | .......... | 340/479 |
| 6,955,406 B2 * | 10/2005 | Blue | ................................. | 303/7 |
| 6,995,687 B2 * | 2/2006 | Lang et al. | ................. | 340/932.2 |
| 7,114,786 B2 * | 10/2006 | Bess et al. | ......................... | 303/7 |
| 7,461,318 B2 * | 12/2008 | Fukae et al. | .................. | 714/749 |
| 7,930,446 B2 * | 4/2011 | Kesselman et al. | ............. | 710/30 |
| 2002/0030590 A1 * | 3/2002 | Dieckmann et al. | .......... | 340/431 |
| 2003/0025596 A1 * | 2/2003 | Lang et al. | .................... | 340/435 |
| 2003/0078011 A1 * | 4/2003 | Cheng et al. | ..................... | 455/73 |
| 2004/0109427 A1 * | 6/2004 | Sydon et al. | ................... | 370/337 |
| 2005/0178622 A1 * | 8/2005 | Blue | ............................ | 188/71.1 |
| 2006/0049686 A1 * | 3/2006 | Bess et al. | ......................... | 303/7 |
| 2006/0255961 A1 * | 11/2006 | Hofer et al. | ............. | 340/825.22 |
| 2008/0238636 A1 * | 10/2008 | Birging et al. | ............. | 340/426.1 |
| 2009/0072956 A1 * | 3/2009 | Kalous | .......................... | 340/431 |
| 2009/0086843 A1 * | 4/2009 | Li | ................................. | 375/285 |
| 2009/0093928 A1 * | 4/2009 | Getman et al. | .................. | 701/37 |

FOREIGN PATENT DOCUMENTS

| | | |
|---|---|---|
| DE | 10044034 A1 | 4/2002 |
| DE | 20110339 U1 | 10/2002 |
| DE | 10255301 A1 * | 6/2004 |
| EP | 1013533 A1 | 6/2000 |
| EP | 12561142 A1 | 11/2002 |
| GB | 2322918 A | 9/1998 |
| WO | 0211307 A | 2/2002 |
| WO | 2004004196 A | 1/2004 |
| WO | 2005076485 A1 | 8/2005 |

* cited by examiner

*Primary Examiner* — Khoi Tran
*Assistant Examiner* — Jorge Peche
(74) *Attorney, Agent, or Firm* — Laurence A. Greenberg; Werner H. Stemer; Ralph E. Locher

(57) ABSTRACT

A method for assigning a first motor vehicle to a second motor vehicle by exchanging electromagnetic signals. The electromagnetic signals are transmitted from the first motor vehicle in a predetermined temporal signal pattern and received by the second motor vehicle, where they are compared as to whether the received electromagnetic signals correspond to a signal pattern stored in the second motor vehicle. The first motor vehicle then is assigned as a function of the comparison. This method is particularly suited to assigning trailers to a towing vehicle.

8 Claims, 1 Drawing Sheet

METHOD AND DEVICE FOR ASSIGNING A FIRST AUTOMOBILE TO A SECOND AUTOMOBILE

BACKGROUND OF THE INVENTION

Field of the Invention

The invention relates to a method and a device for assigning a first motor vehicle to a second motor vehicle.

In order to exchange relevant data between two motor vehicles, e.g. a towing vehicle and its trailer, it is necessary for a clear assignment to take place between the two motor vehicles.

If other motor vehicles are in direct proximity when connection is established between a trailer and a towing vehicle, there is the risk that a signal connection, e.g. by means of a HF connection, is not established between the coupled motor vehicles.

A radio system is used for the connection between controllers in the towing vehicle and on the trailer. No user interaction is needed for acceptance while the connection is being established.

BRIEF SUMMARY OF THE INVENTION

The object underlying the present invention is thus to indicate a way in which a reliable signal connection is enabled between a motor vehicle and its trailer.

This object is achieved in accordance with the invention by a method with the features of claim 1 and a device with the features of claim 6. Advantageous embodiments and developments, which can be used individually or in combination with one another, form the subject matter of the dependent claims.

In a first aspect of the invention, a method is proposed for assigning a first motor vehicle to a second motor vehicle by means of exchanging electromagnetic signals with the following method steps:
 transmitting electromagnetic signals from the first motor vehicle, with the electromagnetic signals being sent in a predetermined temporal signal pattern,
 receiving the electromagnetic signals transmitted from the first motor vehicle by means of the second motor vehicle,
 comparing in the second motor vehicle whether the received electromagnetic signals correspond to a signal pattern stored in the second motor vehicle,
 assigning the first motor vehicle as a function of the comparison.

In a preferred embodiment of the invention, an assignment of the first motor vehicle takes place, if the comparison produces a correspondence between the received signal pattern and a signal pattern stored in the second motor vehicle.

In a further preferred embodiment of the invention, an assignment of the first motor vehicle does not take place, if the comparison does not produce a correspondence between the received signal pattern and a signal pattern stored in the second motor vehicle.

The method according to the invention is expediently repeated if no assignment takes place.

It has proven worthwhile for a temporally non-periodic signal sequence to underlie the temporal signal pattern.

A precise temporal sequence, the so-called timing, is defined for the connection. This is used so that the precise time of coupling the trailer to the towing vehicle is only known to the two relevant motor vehicles. This herewith ensures that the connection can only be established between the two coupled motor vehicles.

During the connection establishment, one motor vehicle assumes the role of the server, which awaits the connection establishment and one motor vehicle assumes the role of the client, which initiates the connection establishment. If the two motor vehicles are coupled, the server allows the connection establishment for a specific time. The client attempts to set up the connection immediately after the coupling process.

A precise time pattern, which can only be maintained by the actual client, is now defined for the connection establishment from time 0 of the coupling process.

In a second aspect of the invention, a device is proposed for assigning an object to a motor vehicle by means of exchanging electromagnetic signals, with the device
 including a communication facility on the motor vehicle side, with which means are designed for receiving electromagnetic signals transmitted from the object in the form of a signal pattern, and
 including a control device on the motor vehicle side, to which the signal pattern can be fed, and with which means are designed in order to compare a stored signal pattern with the feedable signal pattern, with the object being assignable as a function of the comparison.

Further details and advantages of the invention are described with reference to the appended Figure, in which;

DESCRIPTION OF THE INVENTION

Figure 1:
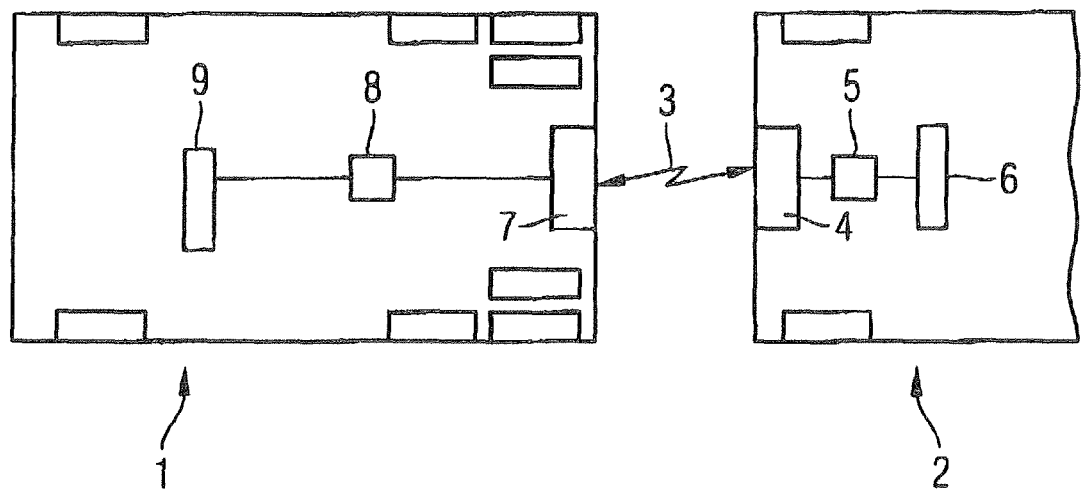
FIG. 1 shows a schematic representation of essential components for the communication between two motor vehicles.

With the subsequent description of a preferred embodiment of the present invention, the same reference characters refer to identical or comparable components.

FIG. 1 shows two motor vehicles 1 and 2, which are to be clearly assigned to one another with the aid of electronic means. The respective communication receivers 4, 7 for motor vehicle 1, 2 control the signal exchange by means of electromagnetic signals 3, typically high-frequency signals 3. The communication receivers 4, 7 are actuated accordingly by each control device 6, 9 by way of a CAN bus 5, 8 in each instance.

Figure 2:
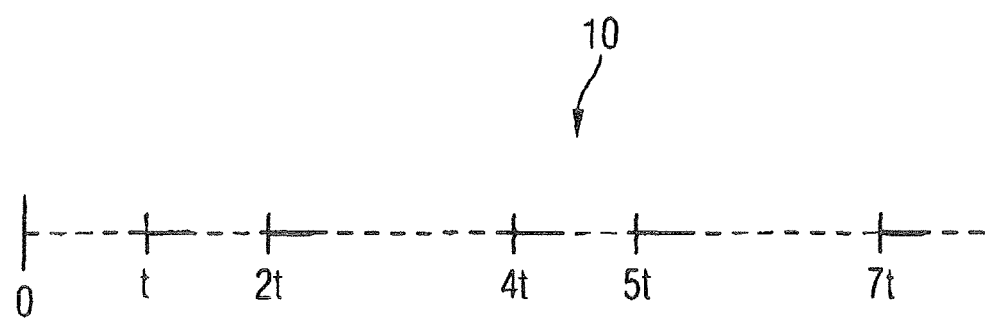
FIG. 2 shows a schematic representation of an exemplary signal pattern.

FIG. 2 shows an exemplary signal pattern 10 of a temporal sequence of signals 3, which is predetermined for the exchange between the motor vehicles 1, 2.

In the example of a coupling process between a trailer, e.g. the motor vehicle 2 and a towing vehicle, e.g. the motor vehicle 1, the exchange of signals 3 for identifying the motor vehicle 2 from motor vehicle 1 is shown below. Starting from the coupling time 0, based on a communication receiver 4 in the motor vehicle 2, an antenna sends high-frequency signals 3 in the form of connection establishment messages at times 1, $2t$, $4t$, $5t$ and $7t$ to the communication receiver 7 in motor vehicle 1. The signals 3, which the communication receiver 7 in the motor vehicle 1 has received, are subsequently forwarded to a control device 9 on the motor vehicle side. The communication between the control device 6 and the communication receiver 4, as well as the control device 9 and the communication receiver 7 is usually carried out by way of a corresponding CAN bus 5, 8. The received signals 3 are analyzed in the control device 9 in respect of their temporal occurrence. If periodic connection establishment messages with the period t are now identified in motor vehicle 1 by a motor vehicle for instance, no assignment takes place since no signals 3 are expected at times 3t and 6t in the predetermined signal pattern 10. If some messages of the coupled motor vehicle 2 get lost as a result of connection faults, an adequately reliable statement relating to the connection can still always be made on the basis of the received messages.

The connection establishment is then concluded successfully, if at time 7t, for example, 3 messages were received synchronously, otherwise a new connection establishment is initiated in accordance with the same pattern.

With the application according to the invention, no user interaction (driver) is needed in order to establish the connection between the towing vehicle and trailer. This nevertheless ensures that the connection can only be established between the coupled motor vehicles and faulty connections can be ruled out.

With the definition of the timing, it is important for as minimal a correlation to other radio connections as possible to be ensured.

The design according to the invention allows a cost-effective and consequently reliable wireless assignment of a trailer to a towing vehicle.

Furthermore, no additional components are needed in the transmit/receive facilities.

The present invention is particularly suited to the assignment of trailers to a towing vehicle.

The invention claimed is:

1. A method for assigning a first motor vehicle to a second motor vehicle by exchanging electromagnetic signals, comprising the steps of:
    transmitting and not transmitting electromagnetic signals from the first motor vehicle to a second motor vehicle at predetermined times to form a predetermined temporal signal pattern;
    receiving, in a receiver in the second motor vehicle starting at a time when the first motor vehicle is coupled to the second motor vehicle, the electromagnetic signals transmitted from the first motor vehicle;
    comparing, in a control device in the second motor vehicle, an expected time pattern stored in the second motor vehicle with a received time pattern formed by times at which the electromagnetic signals transmitted from the first motor vehicle are received in the second motor vehicle and times at which electromagnetic signals from the first motor vehicle are not received in the second motor vehicle; and
    assigning the first motor vehicle to the second motor vehicle if the received signal pattern and the expected pattern of transmission times and non-transmission times stored in the second motor vehicle correspond to each other.

2. The method according to claim 1, which comprises not assigning the first motor vehicle to the second motor vehicle if the received signal pattern and the expected pattern of transmission times and non-transmission times stored in the second motor vehicle do not correspond to each other.

3. The method according to claim 2, including the step of repeating the method of claim 1.

4. The method according to claim 1, wherein the temporal signal pattern is not periodic.

5. The method according to claim 1, wherein the step of transmitting and not transmitting electromagnetic signals from the first motor vehicle to the second motor vehicle at predetermined times to form the predetermined temporal signal pattern includes:
    transmitting a plurality of connection establishment messages, and deciding whether or not to transmit each one of the plurality of connection establishment messages based on the predetermined temporal signal pattern.

6. A device for assigning a first motor vehicle to a second motor vehicle, wherein said device includes:
    a communication device on the second motor vehicle, including a receiver configured to receive, starting at a time when the first motor vehicle is coupled to the second motor vehicle, electromagnetic signals transmitted from the first motor vehicle, wherein the electromagnetic signals are transmitted and not transmitted from the first motor vehicle to the second motor vehicle at predetermined times to form a predetermined temporal signal pattern; and
    a control device on the second motor vehicle, said control device configured to compare an expedited time pattern stored in the second motor vehicle with a received time pattern formed by times at which the electromagnetic signals transmitted from the first motor are received by the received in the second motor vehicle and times at which electromagnetic signals from the first motor vehicle are not received by the receiver in the second motor vehicle;
    said control device configured to assign the first motor vehicle to the second motor vehicle if the received signal pattern and the expected pattern of transmission times and non-transmission times stored in the second motor vehicle correspond to each other.

7. The device according to claim 6, wherein:
    the communication device receives the electromagnetic signals in a form of a plurality of connection establishment messages;
    the received signal pattern indicates whether one of the plurality of connection establishment messages was received at a particular instant in time; and
    the stored signal pattern indicates whether one of the plurality of connection establishment messages should have been received at a particular instant in time.

8. The device according to claim 6, wherein the received time pattern is not periodic.

* * * * *